United States Patent
Mihara

(10) Patent No.: US 8,107,104 B2
(45) Date of Patent: Jan. 31, 2012

(54) IMAGE FORMING APPARATUS

(75) Inventor: Kaoru Mihara, Tokyo (JP)

(73) Assignee: Oki Data Corporation, Tokyo (JP)

( * ) Notice: Subject to any disclaimer, the term of this patent is extended or adjusted under 35 U.S.C. 154(b) by 778 days.

(21) Appl. No.: 12/219,576

(22) Filed: Jul. 24, 2008

(65) Prior Publication Data

US 2009/0051955 A1 Feb. 26, 2009

(30) Foreign Application Priority Data

Aug. 22, 2007 (JP) .................................. 2007-216046

(51) Int. Cl.
*G06K 15/00* (2006.01)
*G06F 3/12* (2006.01)

(52) U.S. Cl. ...................................... 358/1.14; 358/1.15

(58) Field of Classification Search ................. 358/1.15, 358/1.9, 3.28, 404, 400, 444, 468, 1.13, 1.18, 358/1.16, 1.14
See application file for complete search history.

(56) References Cited

U.S. PATENT DOCUMENTS

| | | | |
|---|---|---|---|
| 2003/0023328 A1* | 1/2003 | Yasui | 700/28 |
| 2008/0104683 A1* | 5/2008 | Nagami et al. | 726/5 |
| 2008/0256459 A1* | 10/2008 | Sekiya | 715/741 |
| 2009/0159509 A1* | 6/2009 | Wojdyla et al. | 209/584 |

FOREIGN PATENT DOCUMENTS

JP 2005-327098 11/2005

* cited by examiner

*Primary Examiner* — Jerome Grant, II
(74) *Attorney, Agent, or Firm* — Kubotera & Associates, LLC

(57) ABSTRACT

An image forming apparatus includes a receiving unit for receiving image information including first user information; a detection unit for detecting the first user information from the image information; an input unit for inputting second user information and a process; a comparison unit for comparing the first user information with the second user information; and a control unit for limiting an input through the input unit when the comparison unit determines that the first user information is different from the second user information.

13 Claims, 15 Drawing Sheets

Operation is invalidated
due to difference between
user of processing job and
user of requested job

FIG. 7

Following operation invalidated

Job cancel
AAA menu setting change

FIG. 15

IMAGE FORMING APPARATUS

BACKGROUND OF THE INVENTION

The present invention relates to an image forming apparatus.

In a conventional image forming system, an image forming apparatus such as a printer, a copier, a facsimile, a multi-function product, and the likes is connected to a plurality of host devices through a network. Accordingly, each of the host devices sends print data to the printer, so that the printer performs a printing operation (refer to Patent Reference). Patent Reference: Japan Patent Publication No. 2005-327089

In the conventional image forming system, an operator can operate a user operation unit disposed on the printer even when other job of other operator is in the middle of processing. As a result, the operator inadvertently cancels the other job of the other operator in the middle of processing. That is, when the operator operates, an inadvertent job may be processed during a job of other operator in the middle of processing.

In view of the problem described above, an object of the invention is to provide an image forming apparatus, in which it is possible to solve the problems of the conventional image forming system. In the image forming apparatus of the present invention, it is possible to prevent an inadvertent job from being processed during a job of other operator in the middle of processing.

Further objects of the invention will be apparent from the following description of the invention.

SUMMARY OF THE INVENTION

In order to attain the objects described above, according to the present invention, an image forming apparatus includes a receiving unit for receiving image information including first user information; a detection unit for detecting the first user information from the image information; an input unit for inputting second user information and a process; a comparison unit for comparing the first user information with the second user information; and a control unit for limiting an input through the input unit when the comparison unit determines that the first user information is different from the second user information.

In the present invention, when an operator other than an owner of a processing job performs an operation, the operation is invalidated. Accordingly, it is possible to prevent an inadvertent job from being processed during a job of other operator in the middle of processing.

BRIEF DESCRIPTION OF THE DRAWINGS

FIG. 7 is a schematic view showing a screen of the user operation unit in a state that an operation is invalidated according to the first embodiment of the present invention;

FIG. 15 is a schematic view showing a screen of the user operation unit in a state that an operation is invalidated according to the second embodiment of the present invention.

DETAILED DESCRIPTION OF THE PREFERRED EMBODIMENTS

Hereunder, embodiments of the present invention will be described in more detail with reference to the accompanying drawings. A printer of an electro-photography type will be explained as an image forming apparatus.

First Embodiment

Figure 1:
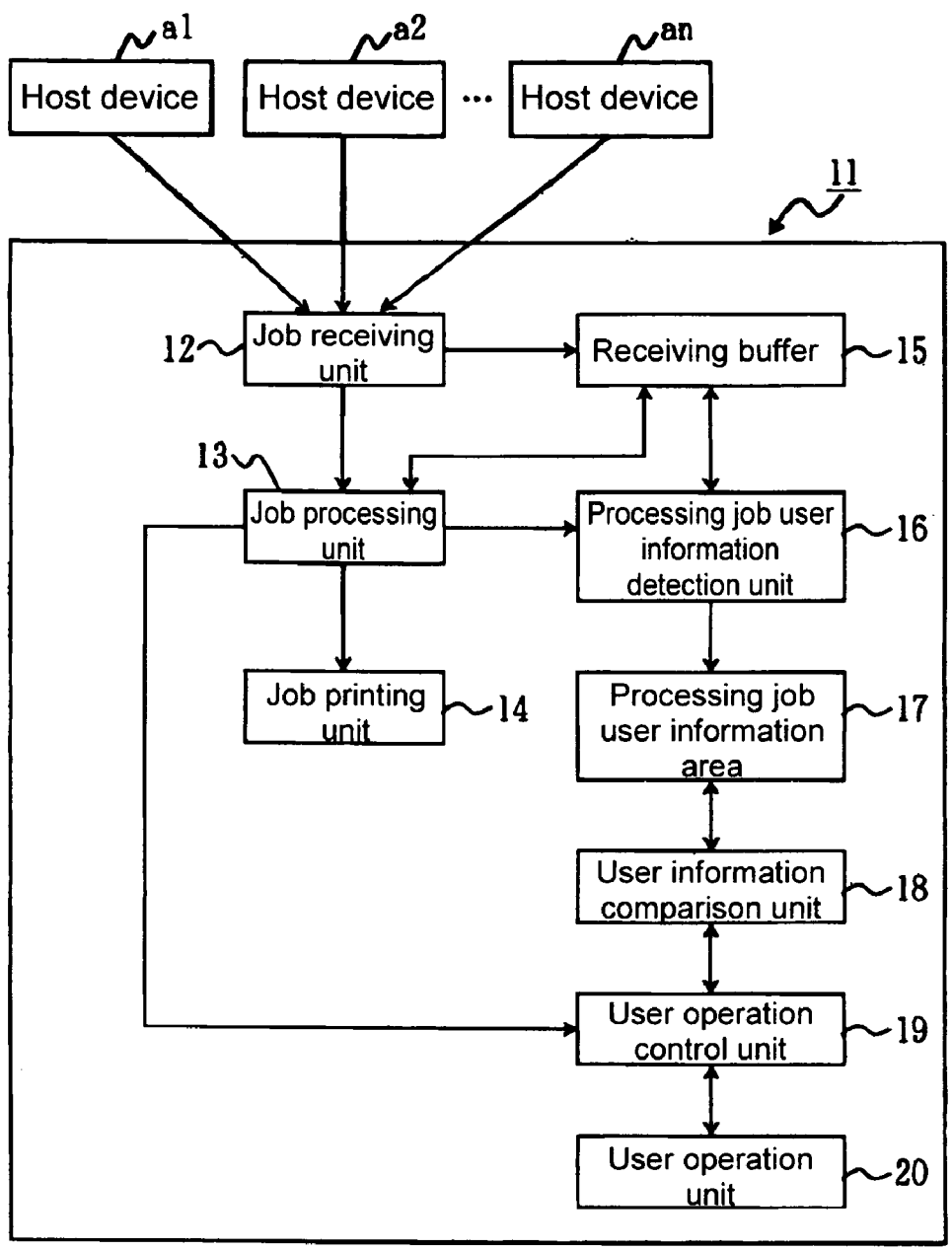
FIG. 1 is a block diagram showing an image forming system according to a first embodiment of the present invention.
Figure 2:
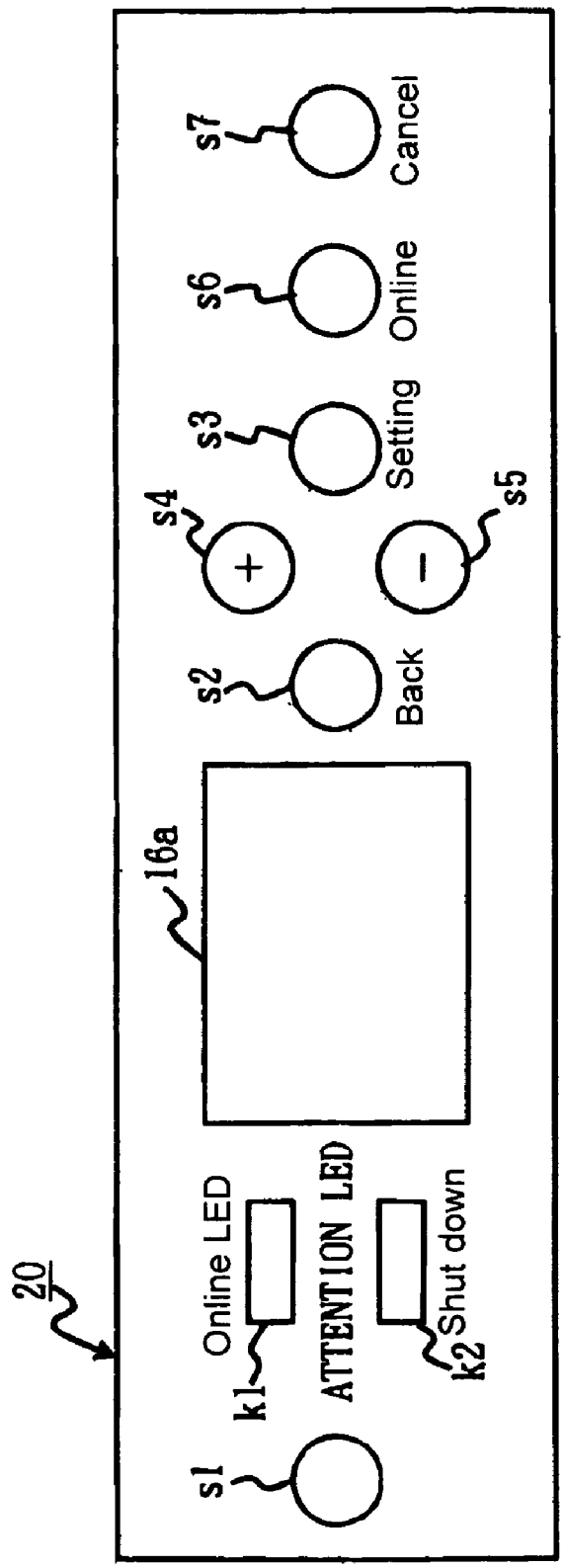
FIG. 2 is a schematic view showing a user operation unit according to the first embodiment of the present invention.
Figure 3:
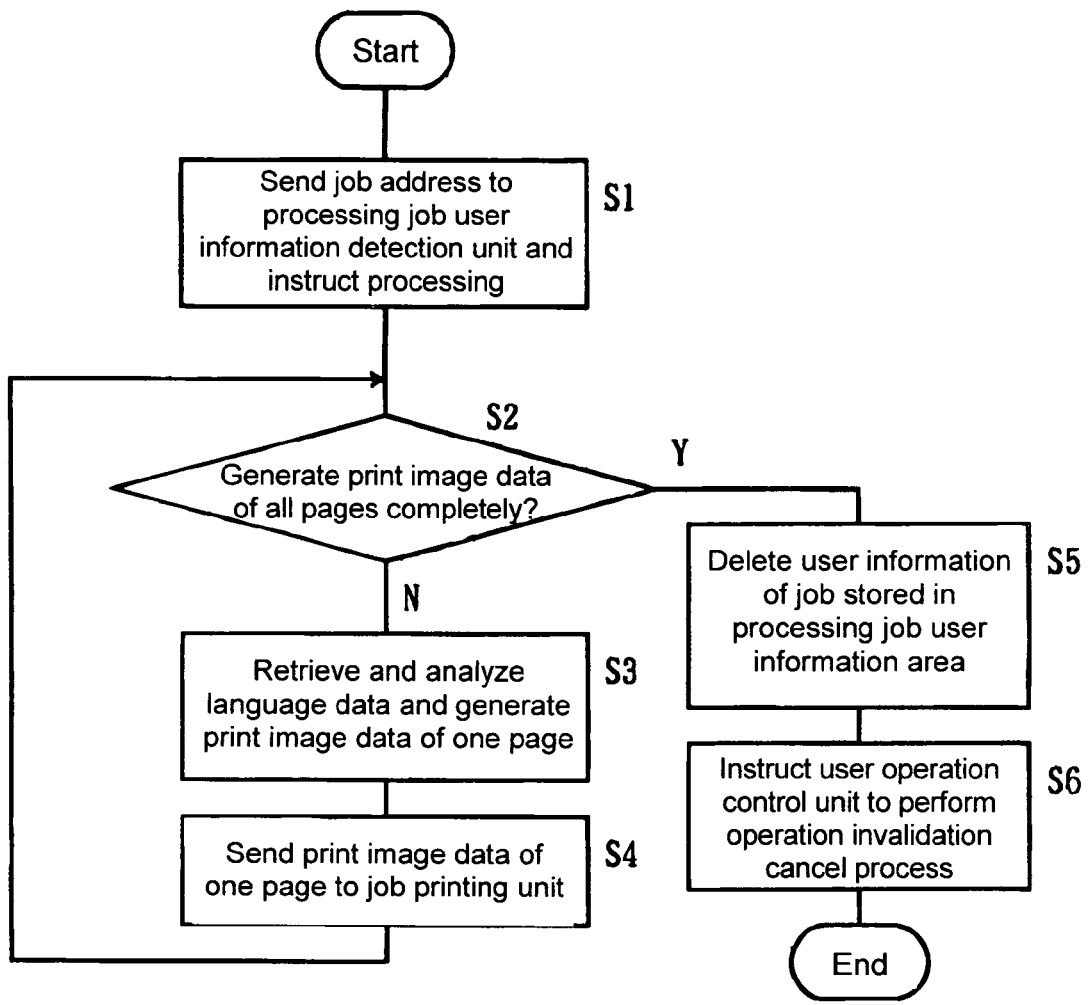
FIG. 3 is a flow chart showing an operation of a job processing unit according to the first embodiment of the present invention.
Figure 4:
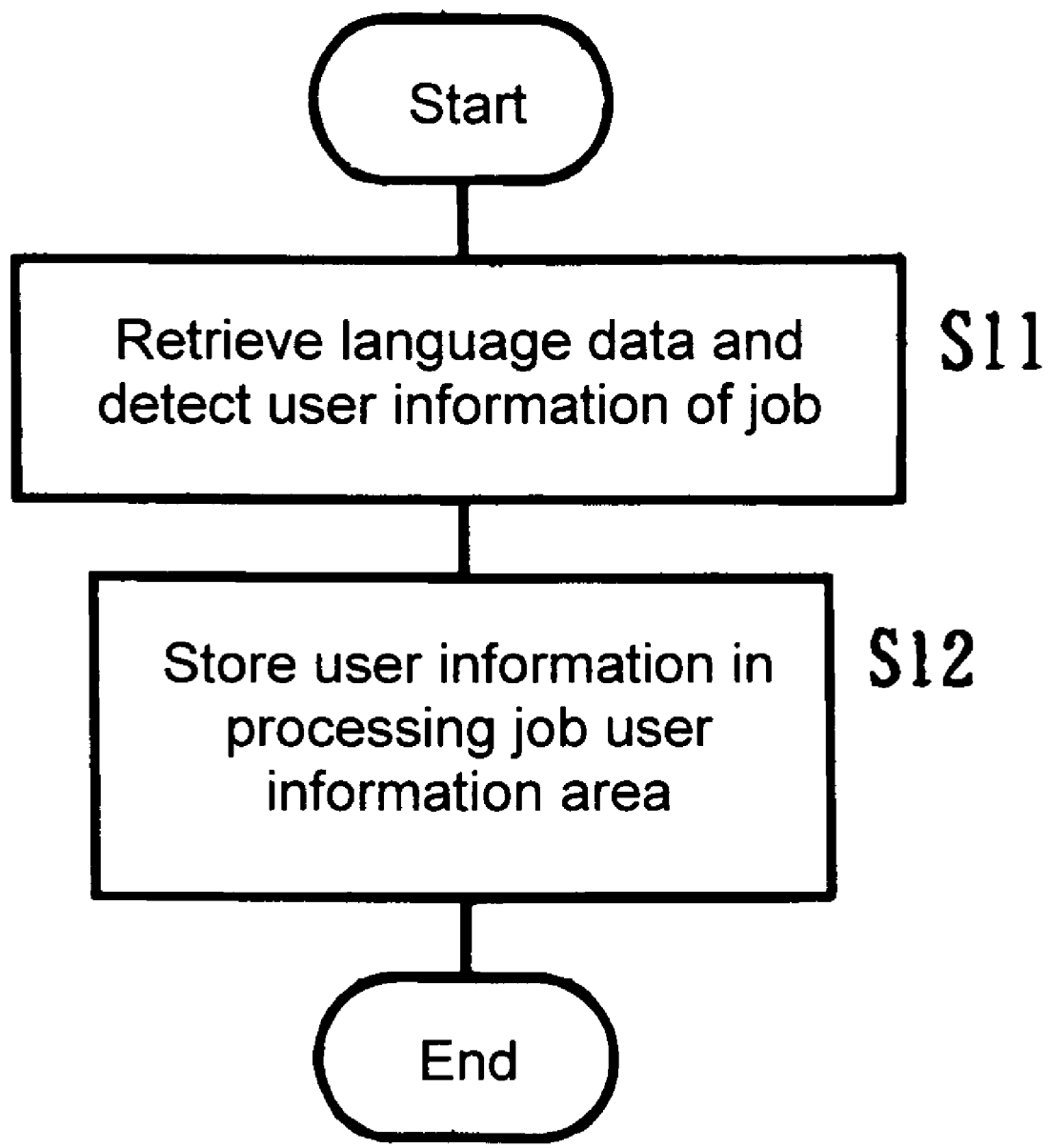
FIG. 4 is a flow chart showing an operation of a processing job user information detection unit according to the first embodiment of the present invention.

A first embodiment of the present invention will be explained. FIG. 1 is a block diagram showing an image forming system according to the first embodiment of the present invention. FIG. 2 is a schematic view showing a user operation unit 20 according to the first embodiment of the present invention. FIG. 3 is a flow chart showing an operation of a job processing unit 13 according to the first embodiment of the present invention. FIG. 4 is a flow chart showing an operation of a processing job user information detection unit 16 according to the first embodiment of the present invention.

Figure 5:
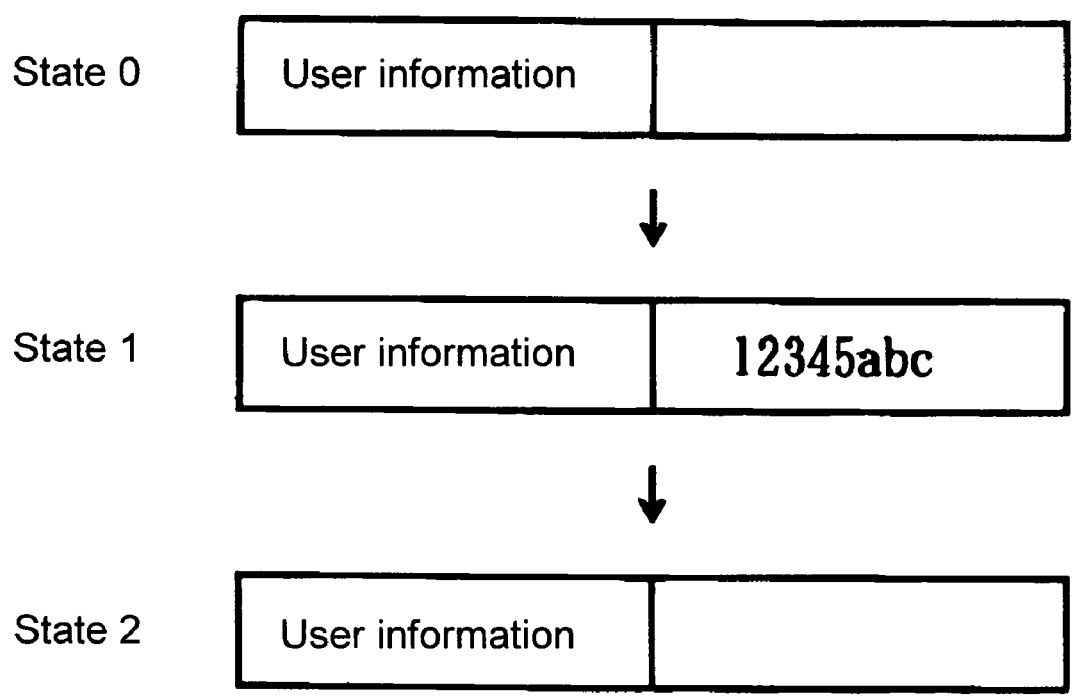
FIG. 5 is a schematic view showing a state of a processing job user information area according to the first embodiment of the present invention.
Figure 6:
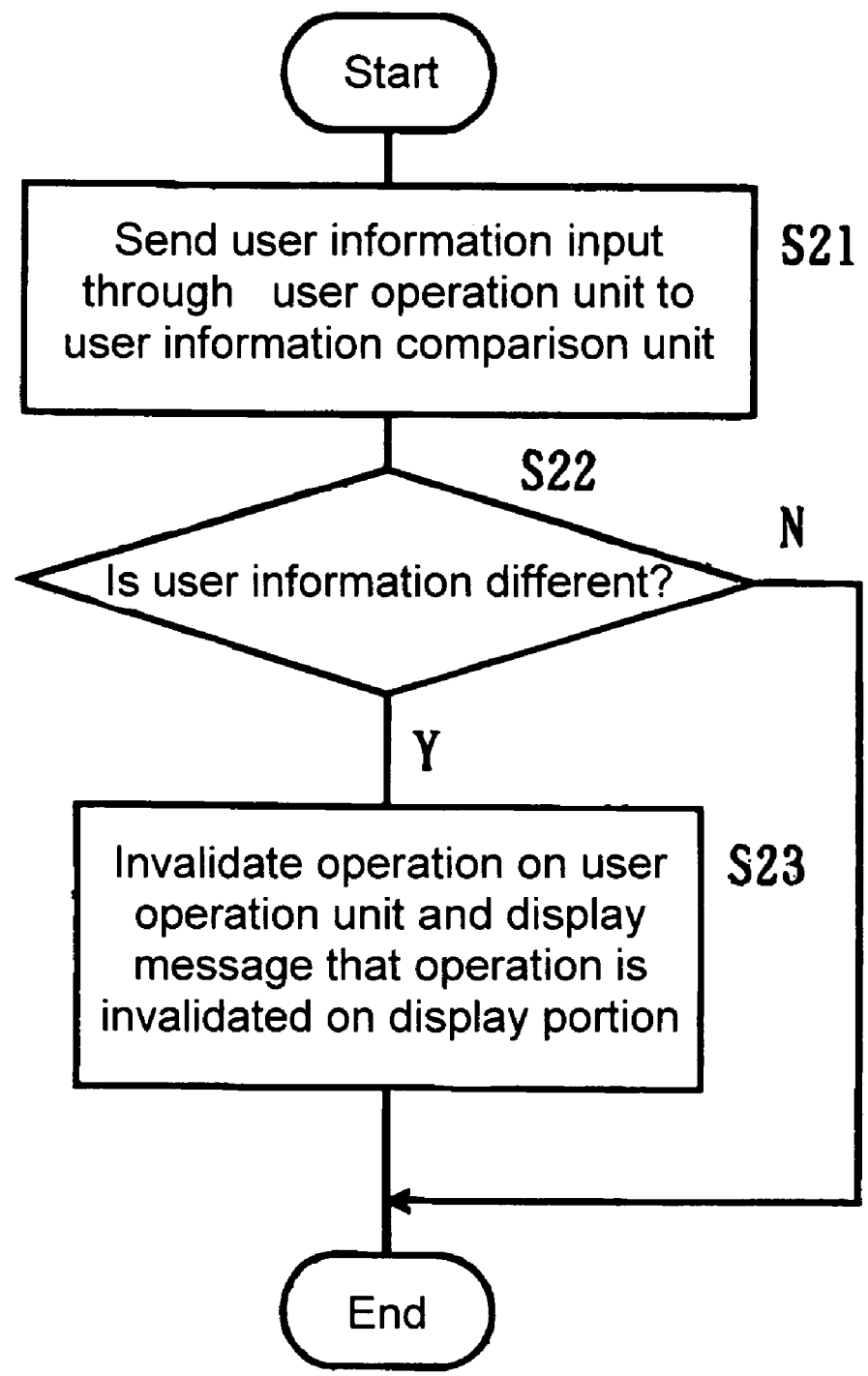
FIG. 6 is a flow chart No. 1 showing an operation of a user operation control unit according to the first embodiment of the present invention.
Figure 8:
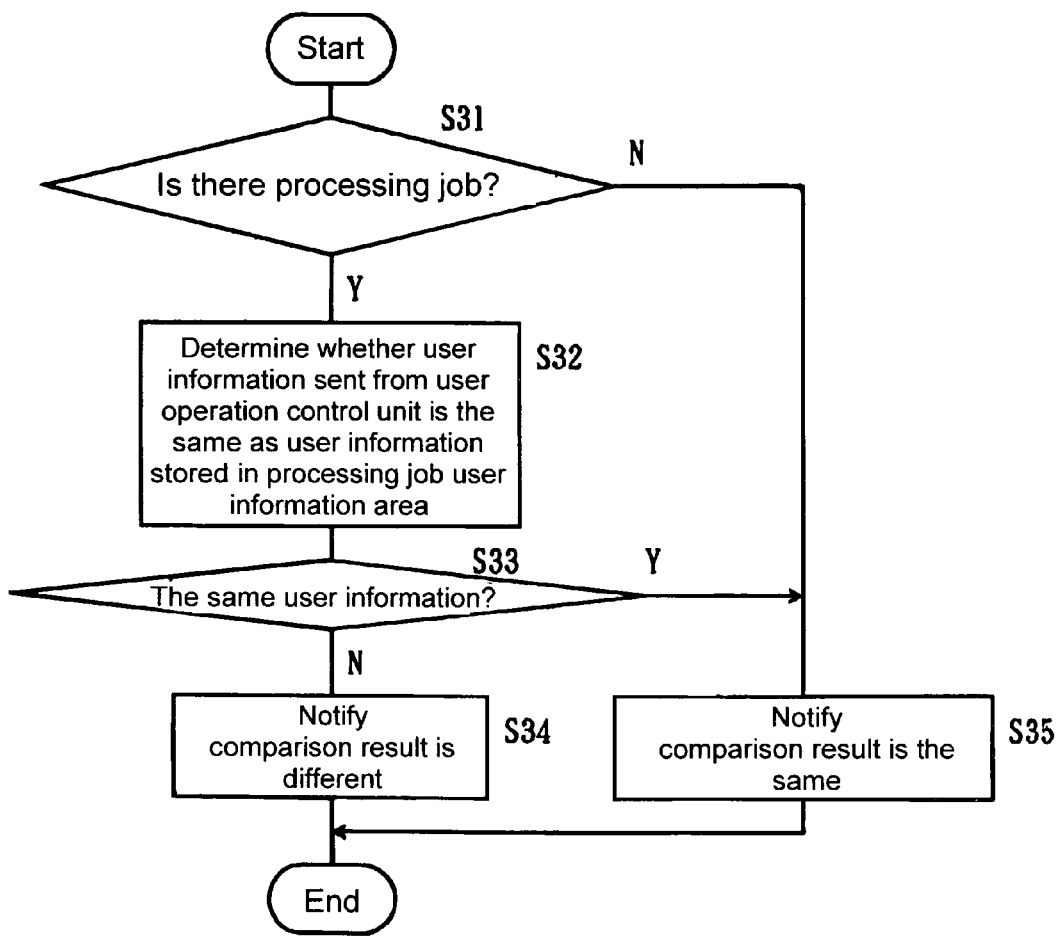
FIG. 8 is a flow chart showing an operation of a user information comparison unit according to the first embodiment of the present invention.
Figure 9:
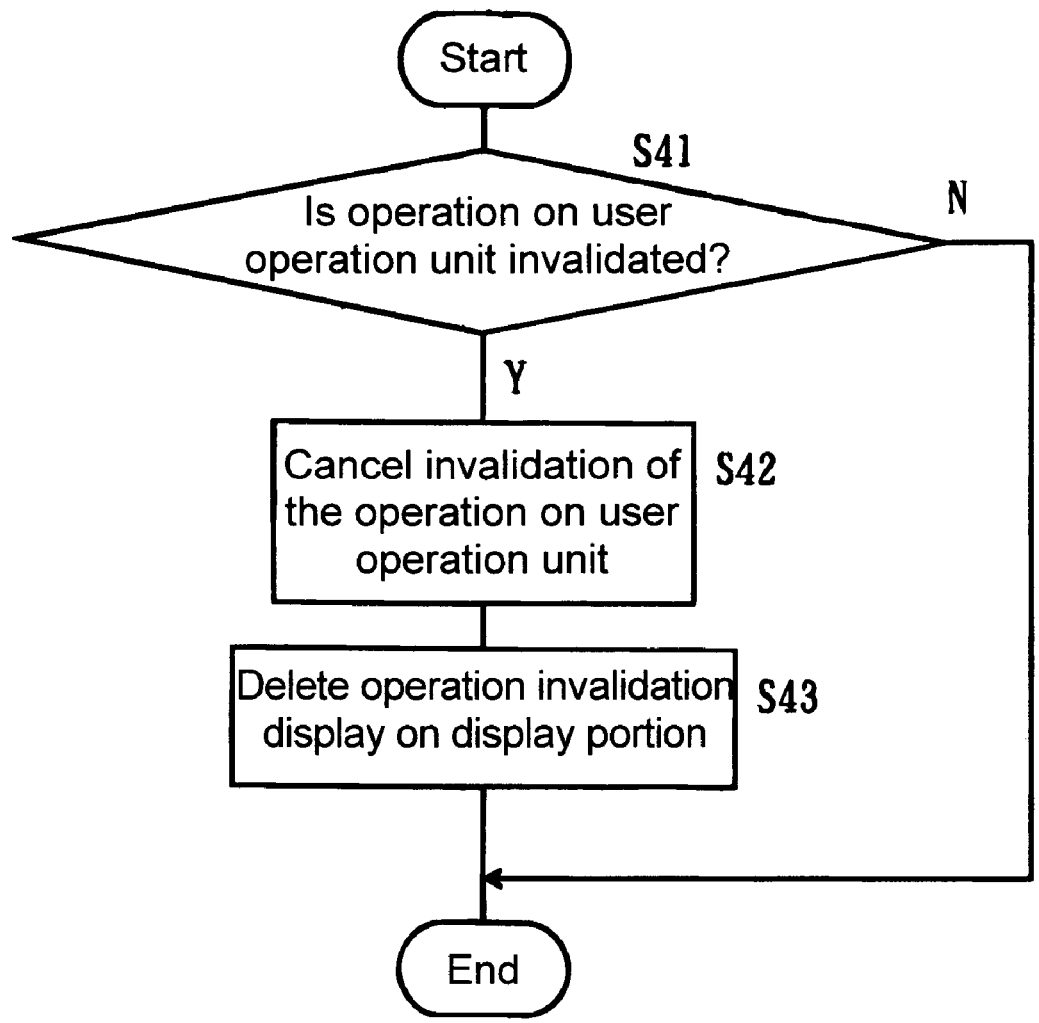
FIG. 9 is a flow chart No. 2 showing the operation of the user operation control unit according to the first embodiment of the present invention.

FIG. 5 is a schematic view showing a state of a processing job user information area 17 according to the first embodiment of the present invention. FIG. 6 is a flow chart No. 1 showing an operation of a user operation control unit 19 according to the first embodiment of the present invention. FIG. 7 is a schematic view showing a screen of the user operation unit 20 in a state that an operation is invalidated according to the first embodiment of the present invention. FIG. 8 is a flow chart showing an operation of a user information comparison unit 18 according to the first embodiment of the present invention. FIG. 9 is a flow chart No. 2 showing the operation of the user operation control unit 19 according to the first embodiment of the present invention.

As shown in FIG. 1, a printer 11 includes a job receiving unit 12; the job processing unit 13; a job printing unit 14 as an image forming unit; a receiving buffer 15; the processing job user information detection unit 16 as a user information detection unit; the processing job user information area 17 as a user information storage unit; the user information comparison unit 18; the user operation control unit 19 as a control unit; and the user operation unit 20 as an operation unit.

In the embodiment, the job receiving unit 12 receives a job as image information sent from host devices ai (i=1, 2, ..., n) such as personal computer and the likes, and stores the job in a receiving order into the receiving buffer 15. The job includes user information indicating a sender as an owner of the job. The user information is used for identifying a sender, and includes, for example, a sender's name, an identification number (ID No.) assigned to a specific user, and the likes.

In the embodiment, the job processing unit 13 retrieves and analyzes language data with respect to the job stored in the job receiving unit 12, so that the job processing unit 13 generates print image data as image data of all pages of the job, thereby sending the print image data to the job printing unit 14. Then, the job printing unit 14 performs a printing operation (forming an image) according to the print image data.

In the embodiment, the processing job user information detection unit 16 detects the user information from the job during processing thereof (processing job), and stores the user information in the processing job user information area 17.

As shown in FIG. 2, the user operation unit 20 includes display portions k1 and k2 formed of LED (Light Emitting Diode); a display portion 16a formed of LCD (Liquid Crystal Display); switches s1 to s7; the likes. An operator operates the user operation unit 20 to cancel the processing job, stop the processing job, or change a menu setting of the printer 11.

In the embodiment, the user operation control unit 19 detects a switch operation state as an operation state of the switches s1 to s7; displays the switch operation state through turning on or off the display portions k1 and k2; displaying a message on the LCD of the display portion 16a; or invalidates an operation of the switches s1 to s7 of the user operation unit 20.

In the embodiment, the user information comparison unit 18 compares the user information input through the operation of the switches s1 to s7 with the user information stored in the processing job user information area 17.

An operation of the image forming system will be explained next. First, an operational flow from receiving the job to generating the print image data of all pages will be explained with reference to FIGS. 3 and 4.

When the upper devices ai (i=1, 2, ..., n) send the job, the job receiving unit 12 stores the job in the receiving order into the receiving buffer 15, and sends an address of the receiving buffer 15 with language data as job data stored therein in the receiving order to the job processing unit 13. Then, the job processing unit 13 sends the address to the processing job user information detection unit 16, thereby instructing processing.

In the next step, when the processing job user information detection unit 16 receives the instruction of the processing from the job processing unit 13, the processing job user information detection unit 16 retrieves the language data from the address, so that the processing job user information detection unit 16 detects the user information of the job included in the language data, thereby storing the user information in the processing job user information area 17.

In the embodiment, the user information in the language data is defined with, for example, a command such as @OK USERINFO="12345abc". In this case, the user information is "12345abc".

In the next step, when the processing job user information detection unit 16 completes the processing, the job processing unit 13 determines whether the print image data of all pages are completely generated. When the print image data of all pages are not completely generated, the job processing unit 13 retrieves the language data from the address, so that the job processing unit 13 generates the print image data of one page, thereby sending the print image data to the job printing unit 14.

When the print image data of all pages are completely generated, the job processing unit 13 deletes the user information of the job stored in the processing job user information area 17, and instructs the user operation control unit 19 to perform an operation invalidation cancel process.

The flow chart shown in FIG. 3 will be explained next. In step S1, the job address is sent to the processing job user information detection unit 16, thereby instructing the processing. In step S2, it is determined whether the print image data of all pages are completely generated. When the print image data of all pages are completely generated, the process proceeds to step S5. When the print image data of all pages are not completely generated, the process proceeds to step S3.

In step S3, the language data are retrieved and analyzed, thereby generating the print image data of one page. In step S4, the print image data of one page are sent to the job printing unit 14. In step S5, the user information of the job stored in the processing job user information area 17 is deleted. In step S6, the user operation control unit 19 is instructed to perform the operation invalidation cancel process, thereby completing the process.

The flow chart shown in FIG. 4 is a detailed process of step S1, and will be explained next. In Step S11, the processing job user information detection unit 16 retrieves the language data, and detects the user information of the job. In step S12, the user information thus detected is stored in the processing job user information area 17, thereby completing the process.

A state of the processing job user information area 17 will be explained next with reference to FIG. 5.

In the embodiment, when there is not the processing job with the job processing unit 13, the processing job user information area 17 becomes a state 0. In the state 0, when the processing job user information detection unit 16 receives the processing instruction from the job processing unit 13 and detects the user information "1234abd", the processing job user information area 17 becomes a state 1. When the print image data of all pages including the user information "1234abc" are completely generated, the processing job user information area 17 becomes a state 2.

An operation of the user operation control unit 19 when the operator operates the user operation unit 20 to input the user information will be explained with reference to FIG. 6.

First, when the operator touches the user operation unit 20, a user information input screen is displayed. In this state, when the operator operates the user operation unit 20 to input the user information, the user operation control unit 19 sends the user information input through the user operation unit 20 to the user information comparison unit 18.

In the next step, the user information comparison unit 18 compares the user information input through the user operation unit 20 with the user information stored in the processing job user information area 17, and sends a comparison result to the user operation control unit 19. Then, a comparison result determination processing unit (not shown) in the user operation control unit 19 determines whether the user information input through the user operation unit 20 is different from the user information stored in the processing job user information area 17.

When the user information input through the user operation unit 20 is different from the user information stored in the processing job user information area 17, an invalidation processing unit (not shown) in the user operation control unit 19 performs an invalidation process, so that the operation on the user operation unit 20 is invalidated, thereby not performing a control according to the operation on the user operation unit 20.

Then, a display processing unit (not shown) in the user operation control unit 19 performs a display process. Accordingly, as shown in FIG. 7, a message such as "No operation due to difference in users of processing job and requested job" is displayed on the display portion 16*a*, so that the operator is notified that the operation on the user operation unit 20 is invalidated. When the user information input through the user operation unit 20 is different from the user information stored in the processing job user information area 17, the comparison process is completed. Afterward, a specifying screen is displayed for specifying other process such as various copies and facsimile.

The flow chart shown in FIG. 6 will be explained next. In step S21, the user information input through the user operation unit 20 is sent to the user information comparison unit 18. In step S22, it is determined whether the user information input through the user operation unit 20 is different from the user information stored in the processing job user information area 17. When the user information input through the user operation unit 20 is different from the user information stored in the processing job user information area 17, the process proceeds to step S23. When the user information input through the user operation unit 20 is not different from (is the same as) the user information stored in the processing job user information area 17, the process is completed. In step S23, the operation on the user operation unit 20 is invalidated, and the message that the operation is invalidated is displayed on the display portion 16*a*, thereby completing the process.

An operation of the user information comparison unit 18 will be explained next with reference to FIG. 8.

First, when the user operation control unit 19 sends the user information to the user information comparison unit 18, the user information comparison unit 18 refers to the processing job user information area 17 and determines whether there is the processing job at the job processing unit 13 in the processing job user information area 17. When there is not the processing job, the user information comparison unit 18 notifies the user operation control unit 19 that a comparison result is the same, thereby completing the process. Note that, when there is not the processing job, the processing job user information area 17 becomes the state 0 or the state 2 shown in FIG. 5.

When there is the processing job, a comparison processing unit (not shown) in the user information comparison unit 18 performs a comparison process. That is, the comparison processing unit (not shown) in the user information comparison unit 18 compares the user information sent from the user operation control unit 19 with the user information stored in the processing job user information area 17, and determines whether the user information sent from the user operation control unit 19 is the same as the user information stored in the processing job user information area 17.

When the user information sent from the user operation control unit 19 is the same as the user information stored in the processing job user information area 17, the comparison processing unit notifies the user operation control unit 19 that the comparison result is the same. When the user information sent from the user operation control unit 19 is not the same as the user information stored in the processing job user information area 17, the comparison processing unit notifies the user operation control unit 19 that the comparison result is not the same.

The flow chart shown in FIG. 8 will be explained next. In step S31, it is determined whether there is the processing job in the processing job user information area 17. When there is the processing job, the process proceeds to step S32. When there is not the processing job, the process proceeds to step S35.

In step S32, it is determined whether the user information sent from the user operation control unit 19 is the same as the user information stored in the processing job user information area 17. When the user information sent from the user operation control unit 19 is the same as the user information stored in the processing job user information area 17, the process proceeds to step S35. When the user information sent from the user operation control unit 19 is not the same as (is different from) the user information stored in the processing job user information area 17, the process proceeds to step S34. In step S34, it is notified that the comparison result is different, thereby completing the process. In step S35, it is notified that the comparison result is the same, thereby completing the process.

An operation of an operation invalidation cancel processing unit (not shown) in the user operation control unit 19 will be explained next with reference to FIG. 9.

In the embodiment, every time when the processing job is completed, an operation invalidation cancel process is performed. The operation invalidation cancel processing unit determines whether the operation on the user operation unit 20 is invalidated. When the operation on the user operation unit 20 is invalidated, the operation invalidation cancel processing unit cancels the invalidation of the operation on the user operation unit 20, and validates the operation. Then, the operation invalidation cancel processing unit deletes the operation invalidation display on the display portion 16*a*.

As described above, in the embodiment, when the processing job user information area 17 becomes the state 1 shown in FIG. 5, and further, for example, the user information input through the user operation unit 20 is "12345abc", the operation on the user operation unit 20 is not invalidated. When the user information input through the user operation unit 20 is not "12345abc", the operation on the user operation unit 20 is invalidated.

More specifically, in the embodiment, when an operator other than the owner of the processing job performs an operation on the user operation unit 20, the operation is invalidated. Accordingly, it is possible to prevent an inadvertent job from being processed during a job of other operator in the middle of processing.

In the embodiment, the job is sent from the upper device ai (i=1, 2, . . . , n), and is not limited thereto. As far as the job corresponds to the user information, the job may be data read through a scanner and the likes.

The flow chart shown in FIG. 9 will be explained. In step S41, it is determined whether the operation on the user operation unit 20 is invalidated. When the operation on the user operation unit 20 is invalidated, the process proceeds to step S42. When the operation on the user operation unit 20 is not invalidated, the process is completed. In step S42, the invalidation of the operation on the user operation unit 20 is canceled. In step S43, the operation invalidation display on the display portion 16*a* is deleted, thereby completing the process.

Second Embodiment

A second embodiment of the present invention will be described below. In the description below, elements in the second embodiment similar to those in the first embodiment are designated by same reference numerals, and explanations thereof are omitted. Explanations of operations and effects in the second embodiment similar to those in the first embodiment are omitted.

Figure 10:
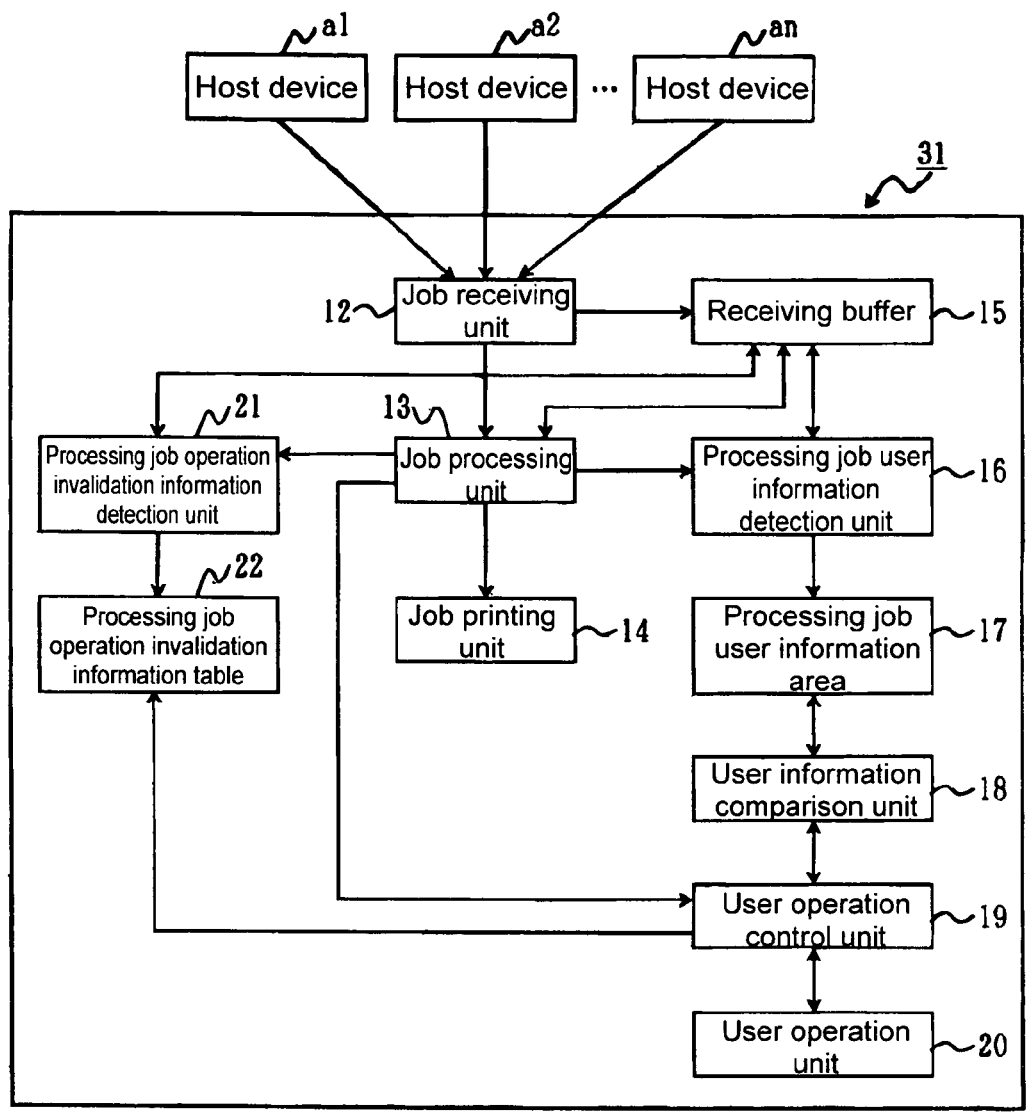
FIG. 10 is a block diagram showing an image forming system according to a second embodiment of the present invention.
Figure 11:
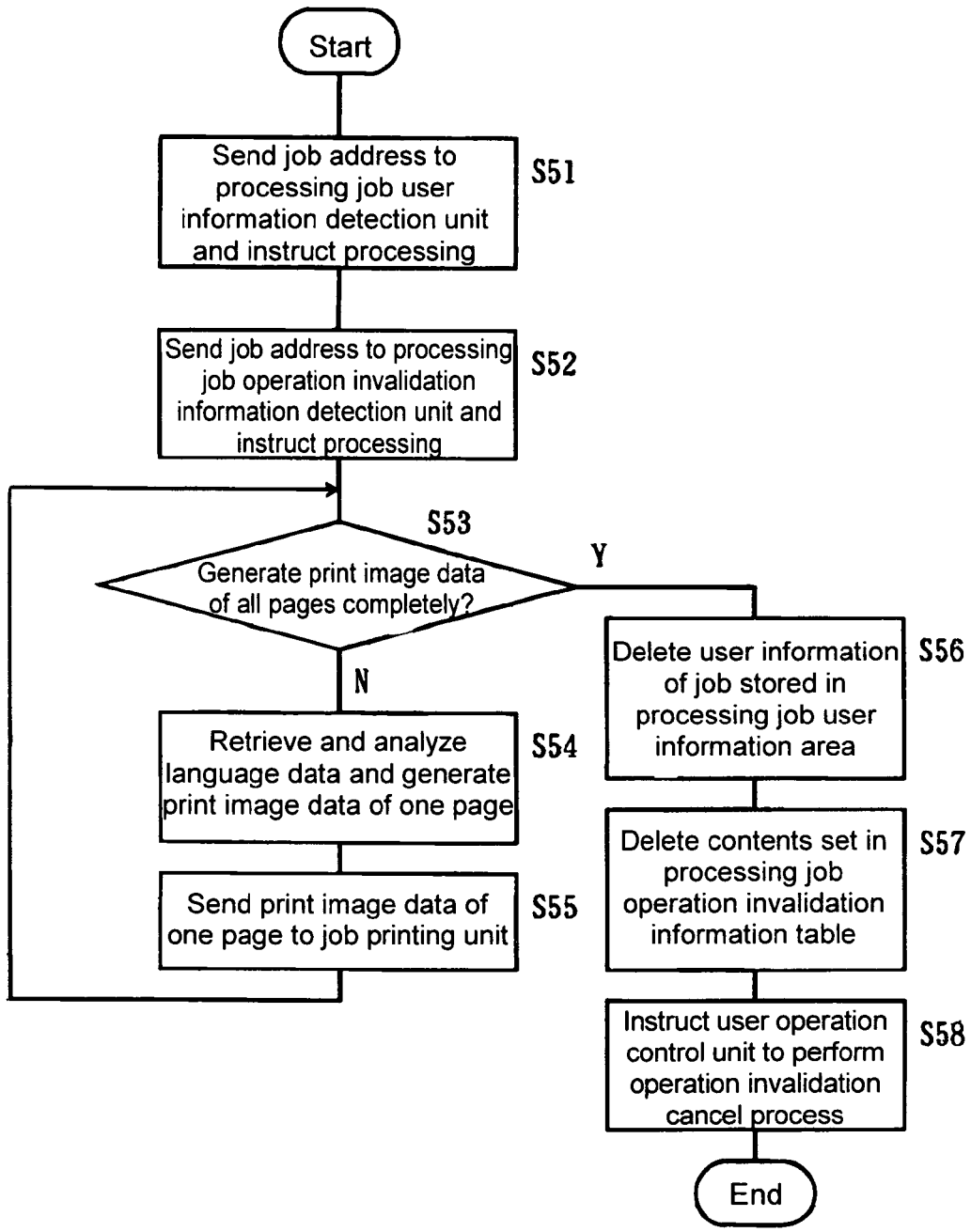
FIG. 11 is a flow chart showing an operation of a job processing unit according to the second embodiment of the present invention.
Figure 12:
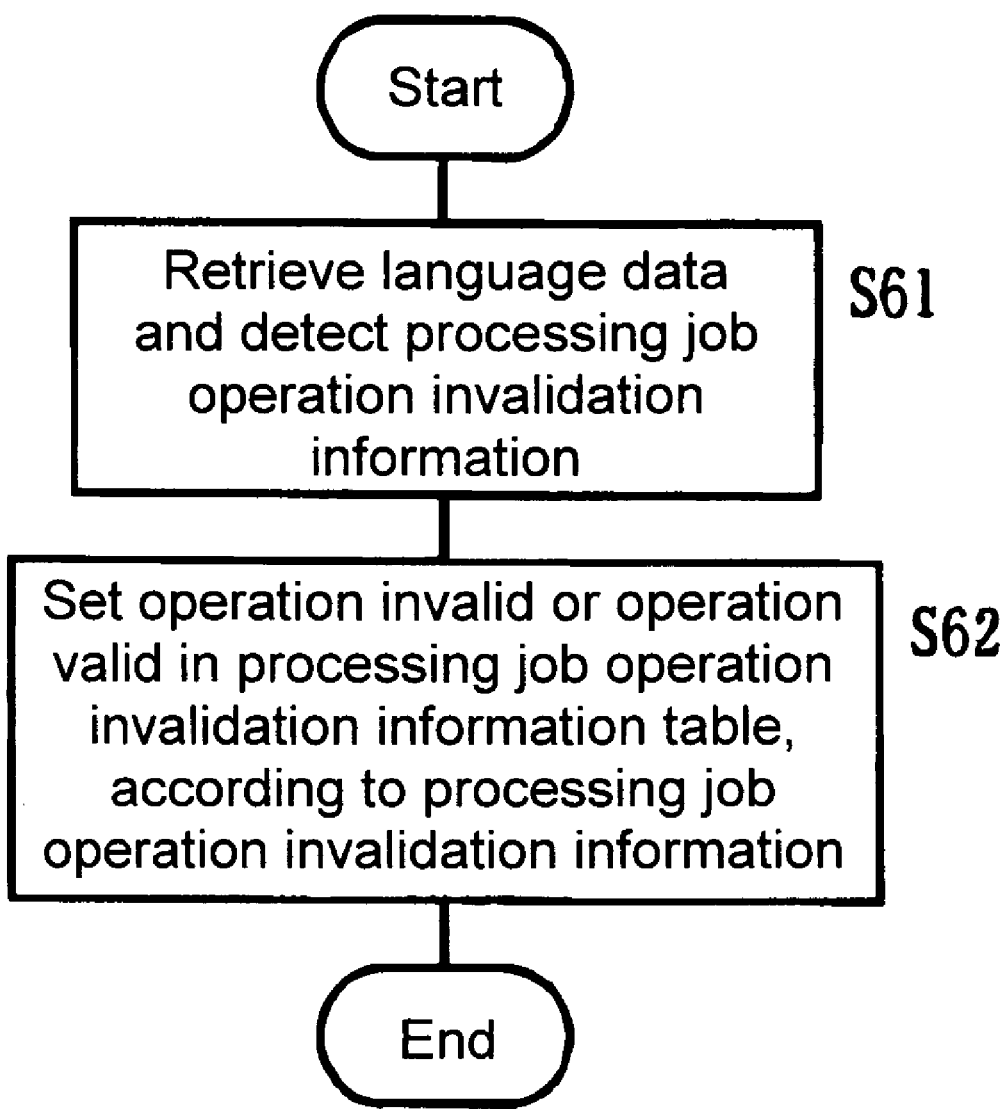
FIG. 12 is a flow chart showing an operation of a processing job operation invalidation information detection unit according to the second embodiment of the present invention.
Figure 13:
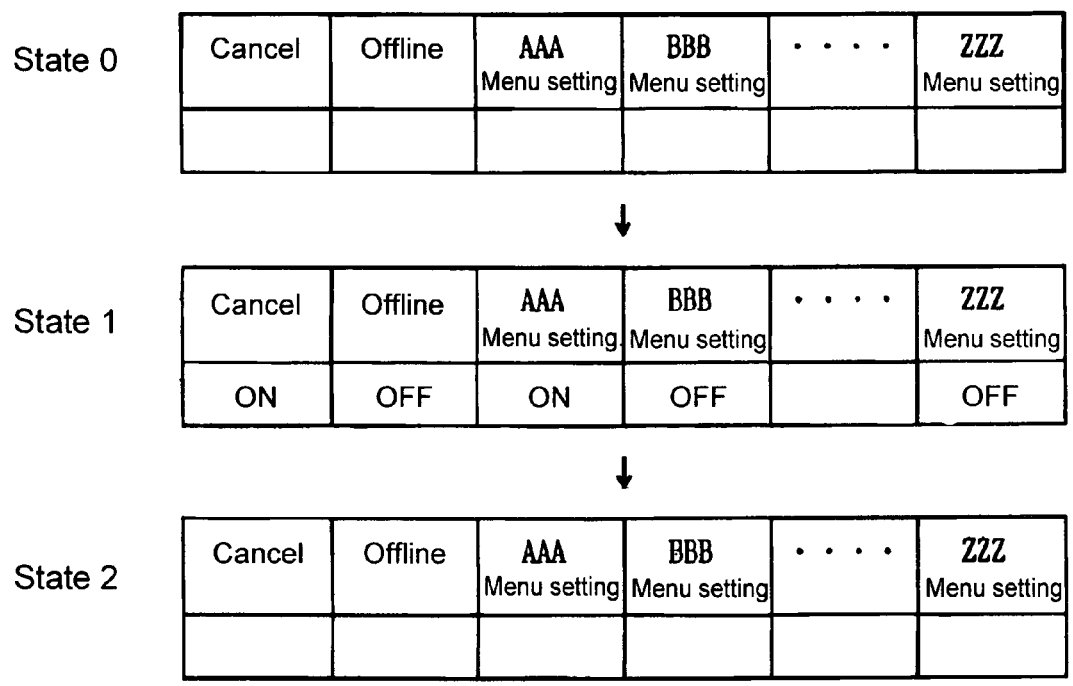
FIG. 13 is a schematic view showing a state of a processing job operation invalidation information table according to the second embodiment of the present invention.
Figure 14:
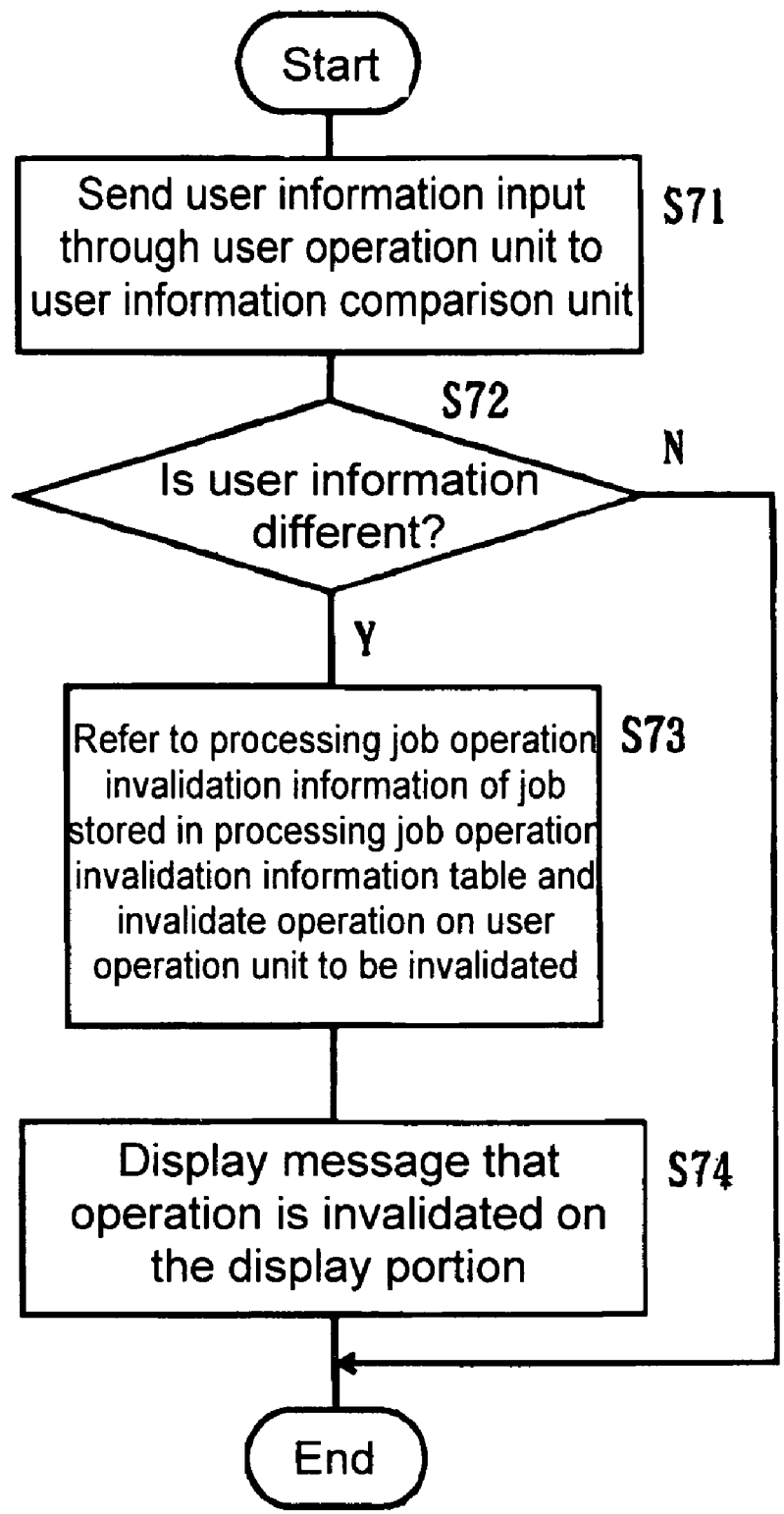
FIG. 14 is a flow chart showing an operation of a user operation control unit according to the second embodiment of the present invention.

FIG. 10 is a block diagram showing an image forming system according to the second embodiment of the present invention. FIG. 11 is a flow chart showing an operation of the job processing unit 13 according to the second embodiment of the present invention. FIG. 12 is a flow chart showing an operation of a processing job operation invalidation information detection unit 21 according to the second embodiment of the present invention. FIG. 13 is a schematic view showing a state of a processing job operation invalidation information table 22 according to the second embodiment of the present invention. FIG. 14 is a flow chart showing an operation of the user operation control unit 19 according to the second embodiment of the present invention. FIG. 15 is a schematic view showing a screen of the user operation unit 20 in a state that an operation is invalidated according to the second embodiment of the present invention.

As shown in FIG. 10, a printer 31 includes the job receiving unit 12; the job processing unit 13; the job printing unit 14 as the image forming unit; the receiving buffer 15; the processing job user information detection unit 16 as the user information detection unit; the processing job user information area 17 as the user information storage unit; the user information comparison unit 18; the user operation control unit 19 as the control unit; the user operation unit 20 as the operation unit; the processing job operation invalidation information detection unit 21; and the processing job operation invalidation information table 22.

In the embodiment, the processing job operation invalidation information detection unit 21 detects information for invalidating an operation while the processing job is being processed, that is, processing job operation invalidation information. Further, the processing job operation invalidation information table 22 stores the processing job operation invalidation information into the processing job operation invalidation information table 22. The processing job operation invalidation information includes information for invalidating an operation performed at the user operation unit 20 such as cancel, offline, setting a menu, stopping processing the job, and the likes.

An operation of the image forming system will be explained next. First, an operational flow from receiving the job to generating the print image data of all pages will be explained with reference to FIGS. 11 and 12.

When the job processing unit 13 stores the user information in the processing job user information area 17, the job processing unit 13 sends an address of the receiving buffer 15 to the processing job operation invalidation information detection unit 21, thereby instructing processing.

In the next step, when the processing job operation invalidation information detection unit 21 receives the instruction, the processing job operation invalidation information detection unit 21 retrieves the language data from the address, so that the processing job operation invalidation information detection unit 21 detects the processing job operation invalidation information included in the language data. Then, the processing job operation invalidation information detection unit 21 determines whether the operation is valid according to the processing job operation invalidation information thus detected, that is, the processing job operation invalidation information detection unit 21 set operation invalid or operation valid in the processing job operation invalidation information table 22.

In the embodiment, the processing job operation invalidation information in the language data is defined with, for example, a command such as "@OK OPERATE-INACTIVE=CANCEL", or "@OK OPERATE-INACTIVE=OFFLINE". In this case, the command of "@OK OPERATE-INACTIVE=CANCEL" invalidates a cancel operation, and the command of "@OK OPERATE-INACTIVE=OFFLINE" invalidates an offline transfer operation.

In the next step, when the processing job operation invalidation information detection unit 21 completes the processing, the job processing unit 13 determines whether the print image data of all pages are completely generated. When the print image data of all pages are not completely generated, the job processing unit 13 retrieves the language data from the address, so that the job processing unit 13 generates the print image data of one page, thereby sending the print image data to the job printing unit 14.

When the print image data of all pages are completely generated, the job processing unit 13 deletes the user information of the job stored in the processing job user information area 17 and the contents set in the processing job operation invalidation information table 22, and instructs the user operation control unit 19 to perform the operation invalidation cancel process.

The flow chart shown in FIG. 11 will be explained next. In step S51, the job address is sent to the processing job user information detection unit 16, thereby instructing the processing. In step S52, the job address is sent to the processing job operation invalidation information detection unit 21, thereby instructing the processing. In step S53, it is determined whether the print image data of all pages are completely generated. When the print image data of all pages are completely generated, the process proceeds to step S56. When the print image data of all pages are not completely generated, the process proceeds to step S54.

In step S54, the language data are retrieved and analyzed, thereby generating the print image data of one page. In step S55, the print image data of one page are sent to the job printing unit 14. In step S56, the user information of the job stored in the processing job user information area 17 is deleted. In step S57, the contents set in the processing job operation invalidation information table 22 are deleted. In step S58, the user operation control unit 19 is instructed to perform the operation invalidation cancel process, thereby completing the process.

The flow chart shown in FIG. 12 is a detailed process of step S51, and will be explained next. In Step S61, the language data are retrieved, and the processing job operation invalidation information is detected. In step S62, the operation invalid or the operation valid is set in the processing job operation invalidation information table 22 according to the processing job operation invalidation information, thereby completing the process.

A state of the processing job operation invalidation information table 22 will be explained next with reference to FIG. 13.

In the embodiment, when there is not the processing job, the processing job operation invalidation information table 22 becomes a state 0. In the state 0, when the job including, for example, "cancel", "AAA menu setting", and the likes becomes the processing job, the processing job operation invalidation information table 22 becomes a state 1. More specifically, among the operations operable on the user operation unit 20, the operations of "cancel" and "AAA menu setting" are turned on (invalidated), and other operations are turned off (not invalidated).

When the print image data of all pages of the jobs including "cancel" and "AAA menu setting" as the processing job operation invalidation information are completely generated, the processing job operation invalidation information table 22 becomes a state 2.

An operation of the user operation control unit 19 when the operator operates the user operation unit 20 to input the user information while the job is being processed will be explained with reference to FIG. 14.

First, when the operator touches the user operation unit 20, the user information input screen is displayed. In this state, when the operator operates the user operation unit 20 to input the user information, the user operation control unit 19 sends the user information input through the user operation unit 20 to the user information comparison unit 18.

In the next step, the user information comparison unit 18 compares the user information input through the user operation unit 20 with the user information stored in the processing job user information area 17, and sends a comparison result to the user operation control unit 19. Then, the comparison result determination processing unit in the user operation control unit 19 determines whether the user information input through the user operation unit 20 is different from the user information stored in the processing job user information area 17.

When the user information input through the user operation unit 20 is different from the user information stored in the processing job user information area 17, the processing job operation invalidation information of the job stored in the processing job operation invalidation information table 22 is referred to, and the operation on the user operation unit 20 is invalidated, thereby not performing a control according to the operation on the user operation unit 20. When the processing job operation invalidation information table 22 is in, for example, the state 1, the operations thus invalidated are "cancel" and "AAA menu setting". The "AAA menu setting" includes, for example, a printing direction setting, a color setting, and the likes.

Accordingly, as shown in FIG. 15, a message such as "Following operation invalidated: job cancel, AAA menu setting change" is displayed on the display portion 16a, so that the operator is notified that the operation on the user operation unit 20 is invalidated.

As described above, in the embodiment, when an operator other than the owner of the processing job performs an operation on the user operation unit 20, the operation is invalidated. Accordingly, it is possible to prevent an inadvertent job from being processed during a job of other operator in the middle of processing.

The flow chart shown in FIG. 14 will be explained next. In step S71, the user information input through the user operation unit 20 is sent to the user information comparison unit 18. In step S72, it is determined whether the user information input through the user operation unit 20 is different from the user information stored in the processing job user information area 17. When the user information input through the user operation unit 20 is different from the user information stored in the processing job user information area 17, the process proceeds to step S73. When the user information input through the user operation unit 20 is not different from the user information stored in the processing job user information area 17, the process is completed. In step S73, the processing job operation invalidation information of the job stored in the processing job operation invalidation information table 22 is referred to, and the operation on the user operation unit 20 to be invalidated is invalidated, and the message is displayed on the display portion 16a, thereby completing the process. In step S74, the operation on the user operation unit 20 is invalidated, and the message that the operation is invalidated is displayed on the display portion 16a, thereby completing the process.

In the embodiments described above, the printer is explained as the image forming apparatus, and the present invention is applicable to a copier, a facsimile, a multifunction product, and the likes.

The disclosure of Japanese Patent Application No. 2007-216046, filed on Aug. 22, 2007, is incorporated in the application.

While the invention has been explained with reference to the specific embodiments of the invention, the explanation is illustrative and the invention is limited only by the appended claims.

What is claimed is:

1. An image forming apparatus comprising:
   a receiving unit for receiving image information including first user information;
   a processing unit for processing the image information received with the receiving unit;
   a detection unit for detecting the first user information from the image information while the processing unit is processing the image information;
   an input unit for inputting second user information while the processing unit is processing the image information;
   a comparison unit for comparing the first user information detected with the detection unit with the second user information input through the input unit when the second user information is input into the input unit; and
   a control unit for limiting an input through the input unit while the processing unit is processing the image information when the comparison unit determines that the first user information is different from the second user information.

2. The image forming apparatus according to claim 1, wherein said control unit is arranged to invalidate the input through the input unit.

3. The image forming apparatus according to claim 1, wherein said input unit is arranged to input a process, and said control unit is arranged to invalidate the process input through the input unit.

4. The image forming apparatus according to claim 3, wherein said control unit is arranged to invalidate the process specified by a user.

5. The image forming apparatus according to claim 3, wherein said control unit is arranged to invalidate the process specified by transmitted data from a user.

6. The image forming apparatus according to claim 1, further comprising a display unit for displaying a state of the image forming apparatus, said control unit controlling the display unit to display a message indicating that the input is limited when the control unit limits the input through the input unit.

7. The image forming apparatus according to claim 6, wherein said control unit is arranged to control the display unit to display a message indicating a reason for limiting the input.

8. The image forming apparatus according to claim 6, wherein said control unit is arranged to cancel the limiting of the input.

9. The image forming apparatus according to claim 1, wherein said comparison unit is arranged to compare the first user information of subsequent image information with the second user information of the subsequent image information to obtain a comparison result when the image information is processed, said comparison unit sending the comparison result to the control unit.

10. The image forming apparatus according to claim 1, wherein said receiving unit is arranged to receive the image information including the first user information formed of a first user specific identification number, said input unit being arranged to receive the second user information formed of a second user specific identification number.

11. The image forming apparatus according to claim 1, wherein said input unit is arranged to input a process, and said control unit is arranged to invalidate the process including a cancellation process of the image information.

12. The image forming apparatus according to claim 1, wherein said input unit is arranged to input a process, and said control unit is arranged to invalidate the process including an editing process of the image information.

13. The image forming apparatus according to claim 1, wherein said input unit is arranged to input a process, and said image information includes information for invalidating the process, said image forming apparatus further comprising a processing job operation invalidation information detection unit for detecting the information for invalidating the process from the image information, said control unit being arranged to limit the input through the input unit according to the information detected with the processing job operation invalidation information detection unit.

\* \* \* \* \*